United States Patent [19]

Dombrowski

[11] Patent Number: 4,597,143
[45] Date of Patent: Jul. 1, 1986

[54] METHOD AND APPARATUS FOR REPROFILING WHEELS

[75] Inventor: Theodor Dombrowski, Erkelenz, Fed. Rep. of Germany

[73] Assignee: Wilhelm Hegenscheidt Gesellschaft mbH, Erkelenz, Fed. Rep. of Germany

[21] Appl. No.: 607,246

[22] Filed: May 4, 1984

Related U.S. Application Data

[63] Continuation-in-part of Ser. No. 331,139, Dec. 16, 1981, abandoned.

[30] Foreign Application Priority Data

Jan. 23, 1981 [DE] Fed. Rep. of Germany ....... 3102091

[51] Int. Cl.⁴ ............................ B23P 7/00; B23C 3/04; B23B 5/28
[52] U.S. Cl. ........................................ 29/27 R; 29/29; 29/558; 82/1 C; 82/8; 409/165
[58] Field of Search .................... 29/27 R, 27 C, 558, 29/565, 566, 29; 409/165, 199; 82/8, 4 E, 6 A, 1 C

[56] References Cited

U.S. PATENT DOCUMENTS

| | | | |
|---|---|---|---|
| 3,598,017 | 8/1971 | Saari | 409/165 |
| 3,667,329 | 6/1972 | Dombrowski | 82/8 |
| 4,134,314 | 1/1979 | Luzina | 82/1 C |
| 4,347,769 | 9/1982 | Dombrowski et al. | 82/8 |

FOREIGN PATENT DOCUMENTS 2713997 10/1978 Fed. Rep. of Germany ............ 82/8

*Primary Examiner*—William R. Briggs
*Attorney, Agent, or Firm*—Arthur B. Colvin

[57] ABSTRACT

The present invention relates to a method and apparatus for reprofiling the wheels of a railroad wheelset by circumferentially milling the wheelset while the wheels are driven and partly supported by drive rollers, the wheelset being partly supported at its bearing housing. Before profile milling, a reference surface is created by a turning operation as base for measuring the radial infeed of the profile milling cutter. The turning tool required is disposed on the profile milling cutter which is lockable secure against rotation. By coordinating the position of the milling devices with the position of the respective turning devices a positional relation is automatically established between the milling device and the axis of the wheelset.

9 Claims, 14 Drawing Figures

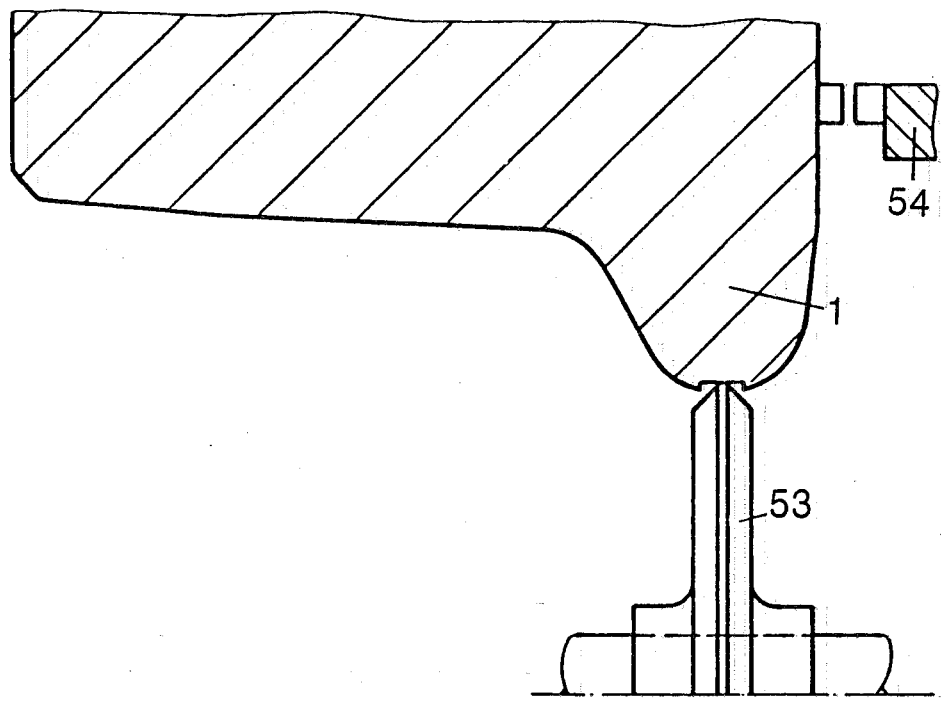
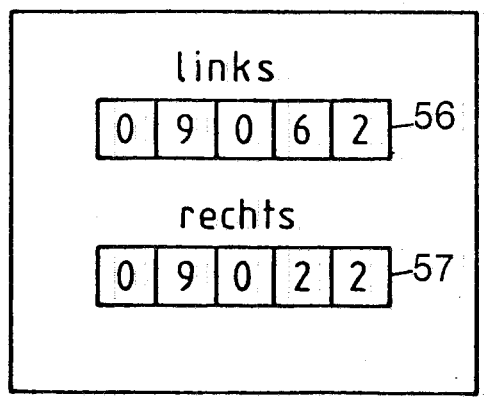
Fig. 4a

METHOD AND APPARATUS FOR REPROFILING WHEELS

The invention is a continuation-in-part of copending application Ser. No. 331,139 filed Dec. 16, 1981 abandoned.

The invention relates to a method for reprofiling the wheels of a railroad wheelset by circumferential milling with at least one profile milling cutter per wheel, the wheelset being driven by support and drive rollers, and to a machine to execute this method.

Known are reprofiling machines in which the wheelset is supported by centers and is driven by rollers engaging the wheel profile (U.S. Pat. No. 2,622,374) and reprofiled by one driven profile milling cutter per wheel.

A disadvantage of supporting the wheelsets in centers is that the bearing covers of the bearing housing must be removed and refastened after the conclusion of the reprofiling operation. This is troublesome and harmful because the dirt on the profile (dust, rust, oil) can easily get into the interior of the unprotected bearing during the reprofiling operation. Removing and refastening of the bearing covers also means additional labor which must be added to the reprofiling costs. Beyond this, center holes are often damaged in earlier machining operations in which the wheelset was supported in centers, and hence the true center will not coincide with the center hole of the damaged wheelset.

Moreover, the wheelset axle sags to a greater degree under the wheel load in the test circle planes of the wheels the further the two axle supports are apart. Undoubtedly, the distance between the two center holes is the greatest possible and, hence, the most unfavorable distance for supporting the wheelsets. Since an out-of-roundness of the reprofiled profile comes about due to each wheel performing an up and down motion in one revolution of the wheelset, the out-of-roundness will be the worse, assuming that the error source remains the same, the greater the distance between the supports of the wheelset axle.

Chucking between centers has another decisive disadvantage. The center hole dimensions on the wheelsets are such that the weight of the wheels alone can be absorbed with great safety. But the center holes are in no way in a position to absorb the entire wheelset load. Thus, if a wheelset has been processed in under-the-floor reprofiling machines utilizing the center hole as a support the center holes show considerable damage in most cases, making them unsuitable for centering.

This problem has been solved in part in under-the-floor reprofiling machines by supporting the wheelset at its bearing boxes (DE-PS No. 22 04 328). However, this support mode entails another problem. Simultaneous with their support function, centers furnish a basis for measuring the diameter because the starting point of a scale can be related to the machine center line running through the centers. This possibility does not exist if the wheelset is supported under its bearing boxes because the exact dimension from the bearing box seating surface to the center of the wheelset axle varies due to the coarse production tolerances on the bearing housings.

This difficulty was eliminated according to DE-PS No. 26 08 940 by machining on each wheel a measuring surface whose diameter is measured, the measuring result being utilized to position the turning tools for the finish cut.

It has also become known through DE-PS No. 18 15 689 to machine such measuring surfaces in the area of the rim flange. In the noted cases the final profiling of the wheel is by a turning operation.

If an attempt were made to adapt such procedures to a milling device, the following difficulties would result:
1. The time required to mill a measuring surface is as long as the entire milling time to reprofile a wheelset. Accordingly, producing a measuring surface consumes so much time that half of the time the milling machine is misused as a measuring machine;
2. The surface produced by milling is a polygon with concave side surfaces. Accordingly, circumferential measuring instruments would dip into the depressions and measure the circumference of the polygon surface, but not the circumference of the wheel circle. At a wheelset speed tolerable for the measuring operation, the measuring wheel works unsteadily due to the polygonal character of the surface produced by milling, because it loses contact with the milled wheelset surface.

U.S. Pat. No. 4,347,769 teaches an apparatus for reprofiling railroad wheels including support means engaging the bearing housing and the wheels, a driven roller engaging the wheel, means to move the support means vertically and horizontally, and means to resist the horizontal cutting force applied to the wheels.

Such a machine has proved very good in practice. However only a turning machining of the wheels of the wheelsets can be carried out by this machine. In this machine the wheelset is supported centerless during the turning operation. This is possible, as described, because methods are known how to position a turning tool correctly despite the centerless supporting of the wheelset.

A particularly favorable method to correctly position turning tools in the case of wheelset-turning machines has become known through the U.S. Pat. No. 4,134,314. With this method in the main a measurable surface for known circumferential friction-wheel-measuring devices is turned in a first cutting of the turning tools, which is only guided in axial direction over a section of the profile of the wheels of the wheelset, which is then measured by these known friction-wheel-measuring devices. Through this procedure the diameter of both wheels of a wheelset and thus the differences in diameters is known, and the position of the turning tools is known which turned the surfaces just measured. From the thus determined starting point of the turning tools, they can be positioned as required to produce a correct wheelset and then, in this correct position, can carry out the complete cutting process by a continued turning operation to produce a correct wheel profile and to produce the same diameter for both wheels of a wheelset.

A similar procedure to that described above has also become known through U.S. Pat. No. 3,667,329 which corresponds to the already discussed DE-PS No. 18 15 689. In both cases the profile of the wheels of a wheelset is reprofiled by a turning operation with a turning tool and, in both cases, a turning tool produces a surface which is measurable by friction-wheel-measuring devices, which is then used as a reference level for the correct positioning of the turning tools. A transference of the noted methods applying to turning procedures to milling machines is not possible because of the reasons mentioned in points 1 and 2. While the expression "milled out of the wheel" is used in column 4, line 60 of U.S. Pat. No. 4,134,314 the person having average skill in the art would recognize that the term "milled" is used in the generic context to indicate a removal of metal rather than as a term of art designating a specific type of metal removing procedure since in the whole of the rest of the patent, turning operations exclusively are described. Thus, the term "milling" in the noted patent represents the description of the finish-machined wheelset, concerning which it is stated in the rest of the patent that it is finished-machined by a turning operation. It is thus clear that the noted reference would connote thereby a turning operation to the skilled worker in the art, who would immediately recognize that "milled out" is utilized to designate areas where metal has been removed by the described turning operation.

Also underfloor wheelset-turning machines have become known from U.S. Pat. No. 4,276,793 and U.S. Pat. No. 3,839,932 according to which the driving and support of the wheelset differs from the known machines, whereby, however, the wheelset is supported centerless. Thus also in the case of these machines the disadvantages of supporting at the centres need not be feared.

The reprofiling of wheels of railroad wheelsets by a turning operation, especially on underfloor turning machines, has generally been proved good and is used worldwide. The reprofiling of wheelsets by a turning operation is simple, very quick and precise. These advantages are the reason for the worldwide success of the reprofiling of wheelsets by a turning operation.

The turning operation has, however, a significant disadvantage. During the turning operation long and very sharp chips are produced which have to be removed by the operators. As the chips are very sharp and, due to their length, often quickly tangled, their removal can be dangerous. Therefore an arrangement must be provided so that a relatively harmless removal of the chips out of the operation area is possible. But still the long sharp chips are not desirable.

To remove this disadvantage when carrying out the turning operation, attempts have been made for years to construct the cutting area of the turning tools in such a way that the arising chips are immediately broken by the turning tool itself so that only short and thus harmless chips are produced. An unusually large number of suggestions has been made which were without exception unsatisfactory. Thus the problem of the chip production in the case of wheelset-turning machines is unsolved today. However the turning operation has prevailed due to the other advantages.

The disadvantage of the unpleasant chip production is avoided when the reprofiling of the wheelsets is carried out by a milling operation, as shown in, for example, U.S. Pat. No. 3,598,017. When carrying out a milling operation small, harmless chips are produced which can simply fall down or when required can be vacuumed. There is no danger attached to chips during a milling operation. Also the result of a milling operation is satisfactory. Reprofiling by a milling operation is, however, time consuming, because, at least two milling operations and normally more than two milling operations are necessary to produce a correct profile. In addition, the milling machine requires the supporting of a wheelset between centers to create a reference level for the profile miller, whereby the abovedescribed disadvantages associated with center support of the wheels appear.

Thus it is an object of the invention to provide a method of reprofiling railroad wheelsets which is carried out using a milling operation to have the advantage of the small chips, but which avoids the disadvantageous supporting of the wheelset between centers and which avoids the usual large amount of time needed when reprofiling by milling.

According to the invention, the problems of the prior art are solved by supporting the wheelset partly at its bearing housings and partly by support and drive rollers engaging the wheel periphery and by performing, prior to circumferential milling, at least in the area of one profile zone of each wheel of the wheelset, a turning operation at a cutting depth no greater than the cutting depth required to restore the new profile in the area of the turned profile zone and no smaller than the cutting depth required to produce a clean surface over the entire circumference, by providing a turning means adjacent to each said wheel, and by utilizing the circumferential surface produced by the turning operation as a reference surface for the radial infeed of a profile milling cutter. This measure makes it possible for the first time to operate without centers when reprofiling by circumferential milling and yet achieve precice reprofiling within a favorable time frame. Such a solution can receive no inspiration from the cited state of the art. The person having average skill in the art previously had the possibility of rejecting the combination of a turning operation with a milling operation as, on the one hand, the advantage of such a combination was not generally recognizable and, on the other hand, the uncontrollable, long, sharp chips would appear, thus destroying the great advantage of milling. The invention has succeeded in taking away this prejudice and clearly showing that the combination of both precedures in a suitable harmonizing way results in the complementation of the advantages of both and, at the same time, in the removal of the disadvantges of both.

According to one embodiment of the invention it is suggested that the turning operation be performed as plunge turning. This can result in a further shortening of the time frame required for reprofiling.

According to another embodiment of the invention it is suggested to perform the turning operation in the area of the profile zone comprising the rim flange, producing a cylindrical surface. The rim flange is readily accessible for a turning operation, and a cylindrical surface is particularly easy to produce by a turning operation on the one hand and particularly easy to measure on the other. Therefore, these measures have a beneficial effect on both time requirement and measuring accuracy.

A machine for the execution of the method according to the invention can be characterized by a pair of support means for said wheels, said support each including portions engaging a bearing housing and a pair of rollers engaging at least the tread of a wheel, at least one of said rollers being driven to effect rotation of its associated wheel, means for moving said support means both horizontally and vertically, said apparatus including means for resisting movement of said wheels in the direction of the horizontal component of a cutting force applied to said wheels, the improvement which comprises first and second turning means each moveably mounted relative to a respective one of said wheels for forming a circumferential cut about a peripheral zone forming a portion of the area of the wheel to be reprofiled, milling means moveable relative to said wheels for reprofiling said wheels and means for sensing the reference surface and correlating the movement of said milling means to effect a desired depth of cut in accordance with a reference surface formed by said turning means. This reprofiling machine design makes possible machining by turning and, subsequently, machining by milling each wheel of the wheelset.

One embodiment of the invention provides that the turning tool be mounted so as to be movable at least axialy. This makes feed turning possible in conventional and known manner.

Another embodiment provides that the turning tools be mounted so as to be movable radially. This makes plunge turning possible and at the same time the machine design in the area of the subassemblies supporting and guiding the turning tool can be particularly simple because only one single direction of motion is required.

In another embodiment of the inventon it is provided that the turning tool be disposed on the profile milling cutter and that the latter be lockable in an angular position suited for the turning operation effected by the turning tool, and be movable radially and/or axially. In this way, the tool carriages for the profile milling cutter and the turning tool can be combined. This simplifies the machine design drastically.

According to another embodiment of the invention it is provided that a single cutting plate of the profile milling cutter be used as the turning tool.

This saves having to provide a special cutting tool for the turning operation.

The invention will now be explained in greater detail by way of an embodiment example.

In the drawing,

FIG. 4a is a sectional view of a further form of measuring setup.

Figure 1:
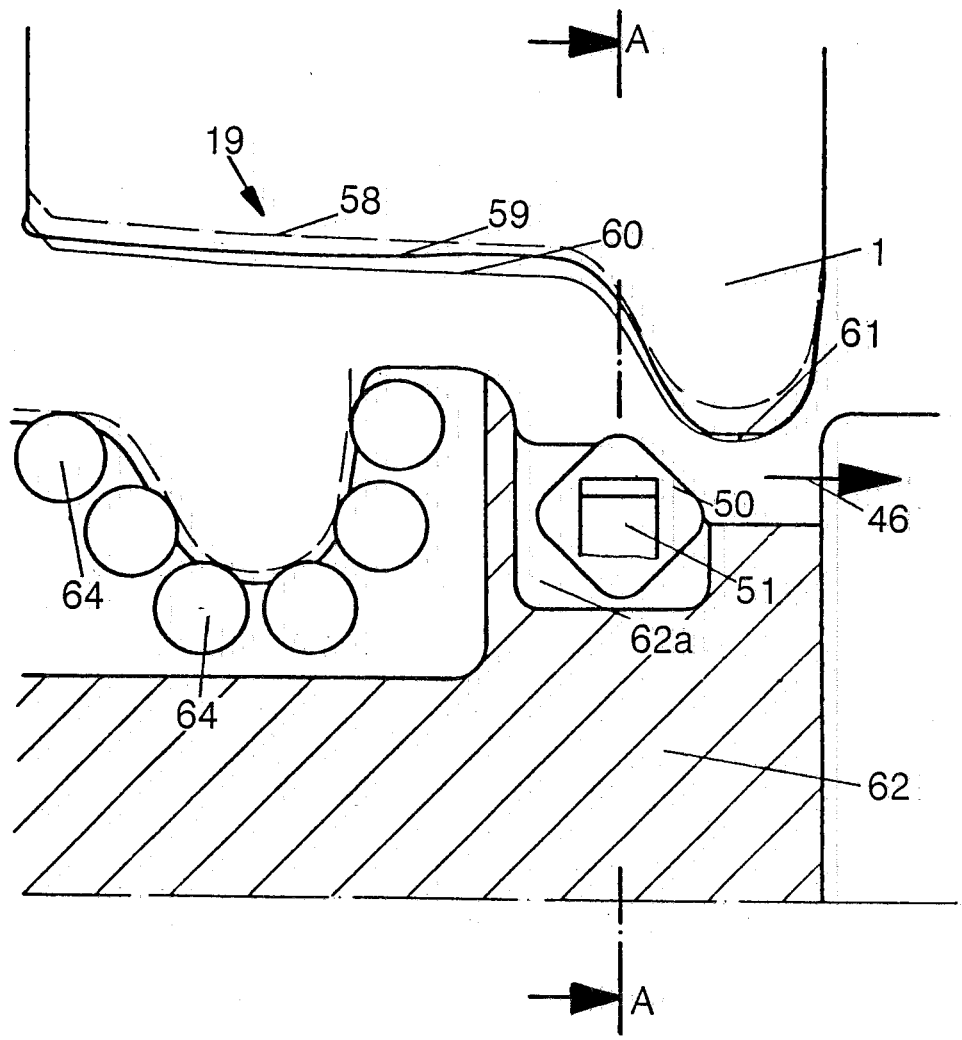
FIG. 1 is a partial vertical section of a profile milling cutter.
Figure 2:
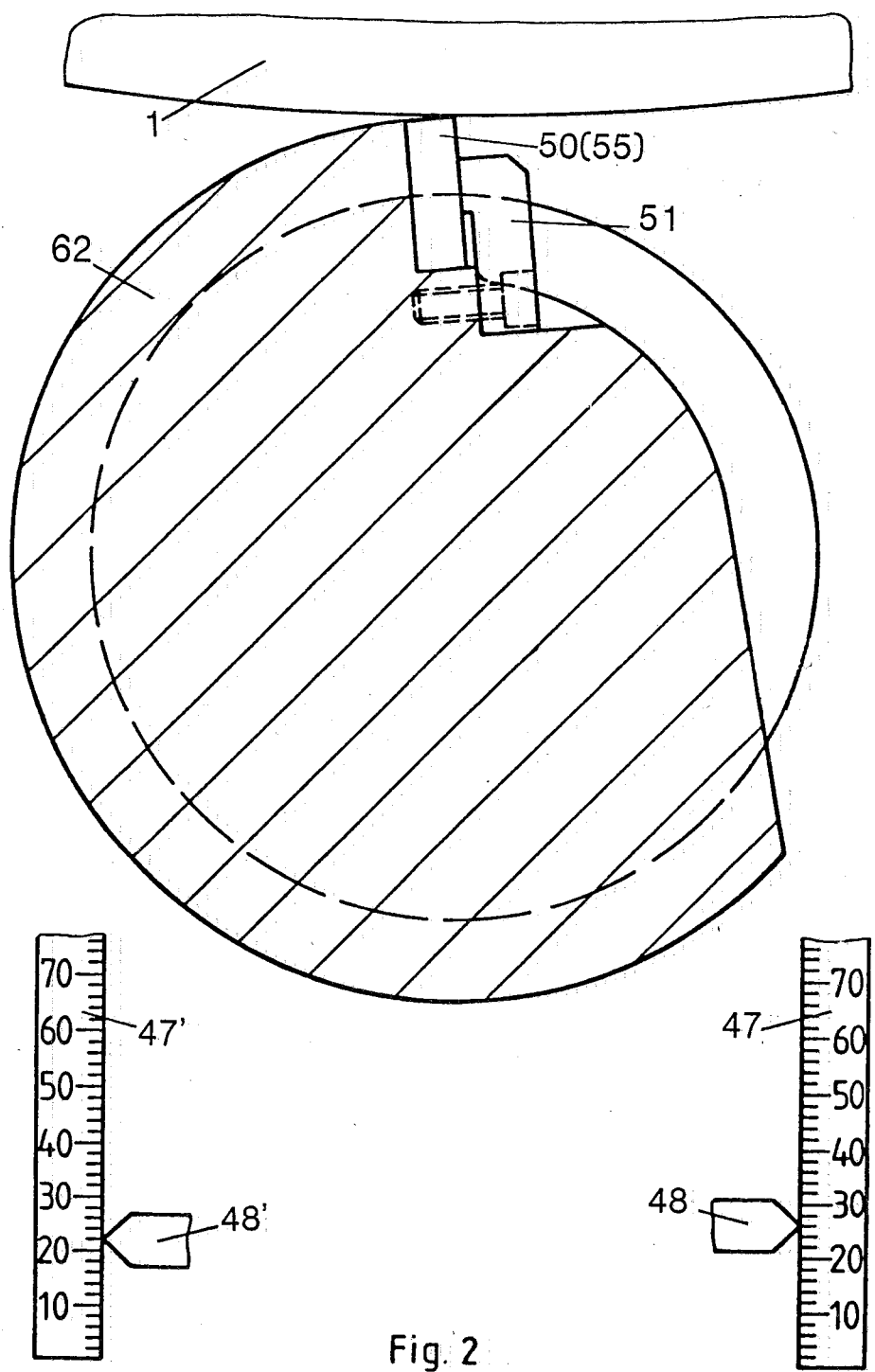
FIG. 2 is a section taken on line A—A of FIG. 1 and having superimposed scales displayed in connection therewith.

In FIGS. 1 and 2, a turning tool 50 and 55, respectively, machines the material 61 of the rim of the worn profile 59 of wheel 1. For this purpose, the tool 50 is moved, for instance, in the direction of arrow 46 so that the rim receives a cylindrical surface. This cutting depth is selected independently for both wheels 1 so as to produce a cylindrical surface approximately 5 mm wide. The reference symbol 60 designates the original profile of the wheel and the reference symbol 59 the worn profile. The reference symbol 58 designates the new profile to be milled. The tool 50 is disposed in a recess 62a of the profile milling cutter 62 and fastened by a clamp 51. The profile milling cutter 62 is shown only in part. To perform a turning operation, the profile milling cutter 62 is brought into a suitable angular position and locked in this angular position—such as through locking of the rotor of the milling cutter drive motor. The tool 50 is shown in lateral position at the start of the turning operation.

Figure 1A:
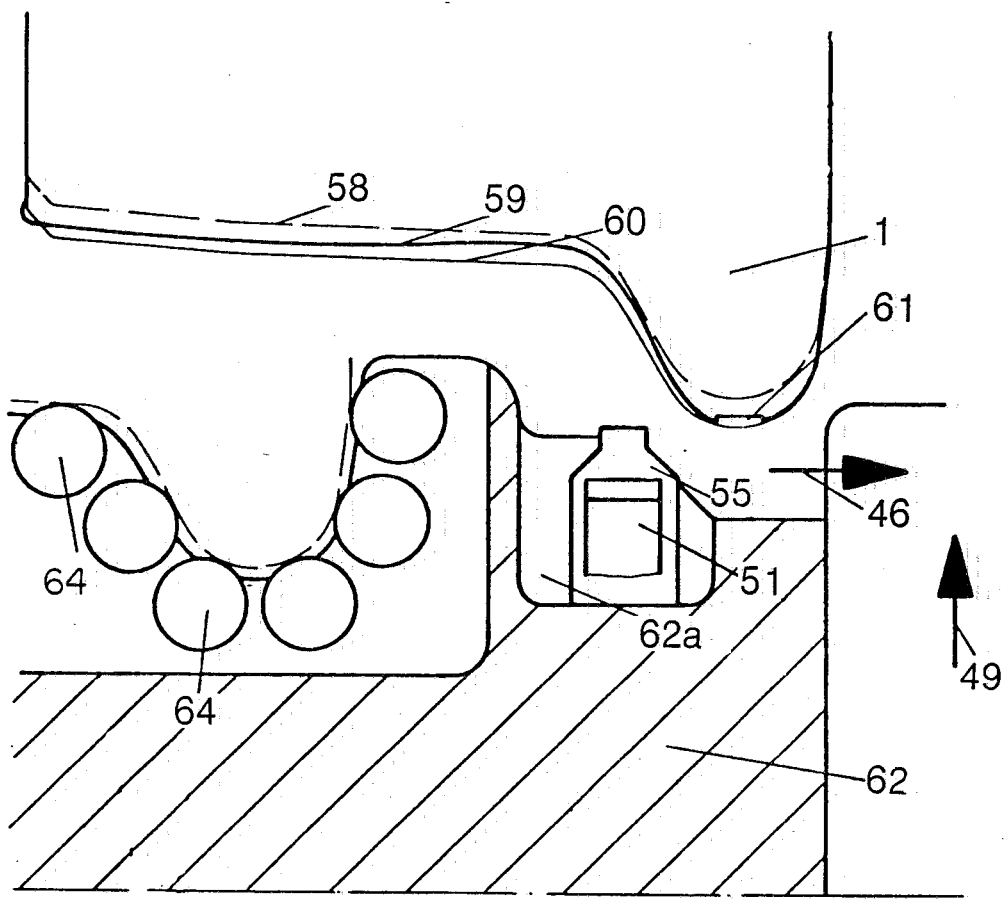
FIG. 1a is a partial vertical section of a profile milling cutter in accordance with an embodiment.

FIG. 1 shows the profile milling cutter 62, in whose recess 62a a tool 55 suited for plunge turning is fastened by means of a clamp 51. Here again, the tool 55 is moved in the direction of arrow 46, but only until it has reached a suitable position for a plunge turnng operation. The tool 55 is then moved in the direction of arrow 49 (FIG. 1a) to perform a plunge turning operation at least until an uninterrupted, clean surface is formed over the entire circumference of the profile area thus machined.

Figure 3:
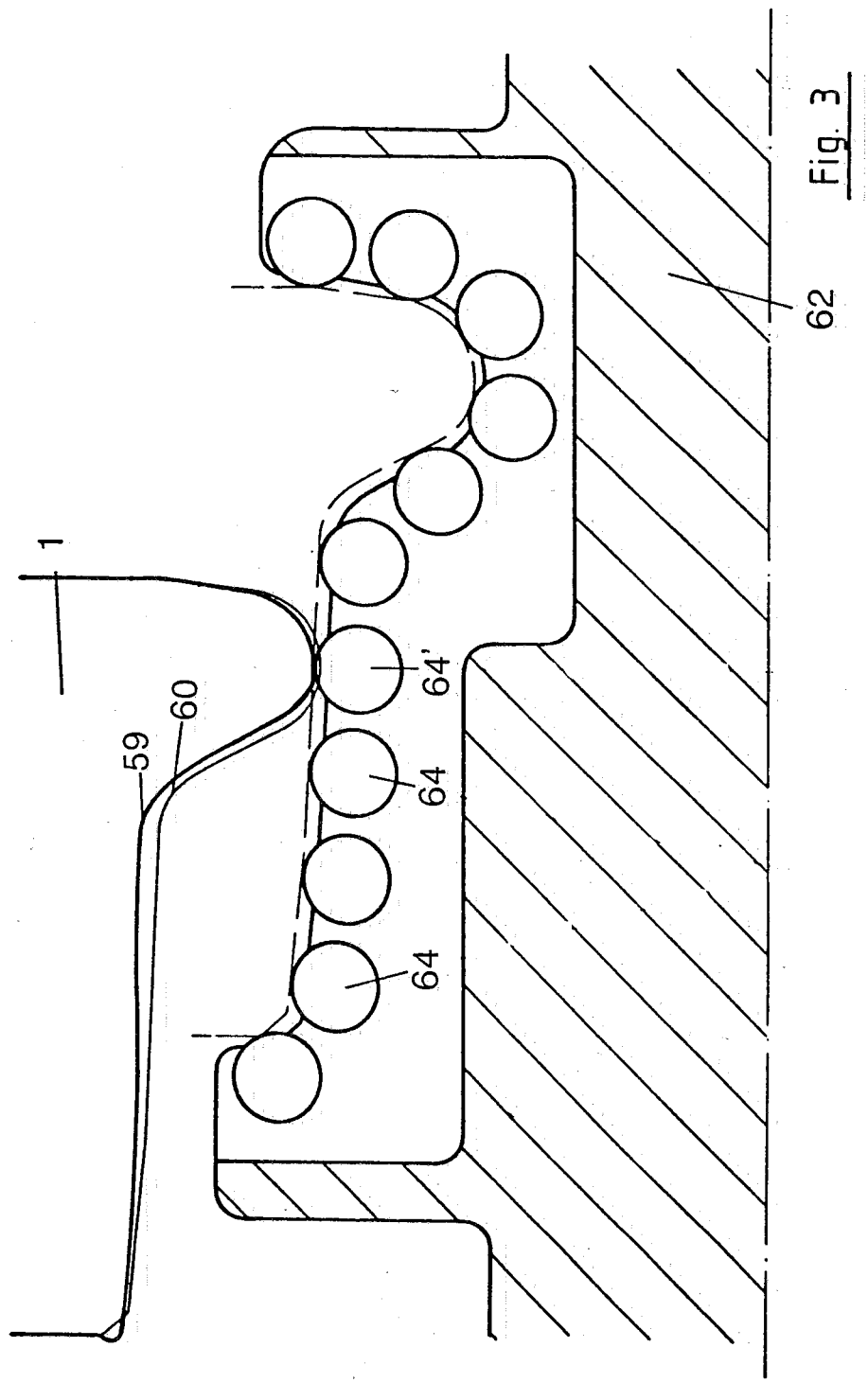
FIG. 3 is a partial section of a profile milling cutter in working position for a turning operation.

FIG. 3 shows that the material 61 can also be turned with a cutting plate 64 of the profile milling cutter 62. In the example according to FIG. 3, the cutting plate 64' is used for this purpose.

Figure 4:
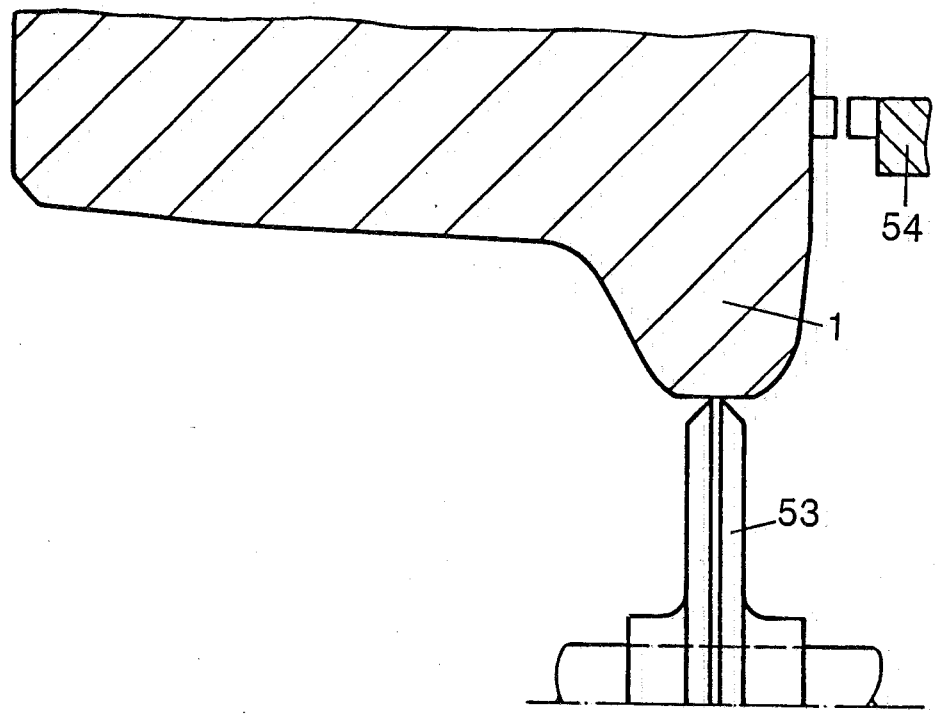
FIG. 4 is a sectional view of a measuring setup.

In FIGS. 4 and 4a the diameters of the cylindricaly turned surfaces of the rim flange are measured by means of a measuring wheel 53 per wheel 1. The measuring wheels 53 corotate with pulse generators, not shown, whose pulses are fed in known manner to two counters 56 and 57. A contactless switching device 54 limits beginning and end of the measurement in known manner.

The diametral size of the measured surfaces of both wheels can be read from the counters 56 and 57. Measuring devices of this kind are known, for which reason their operating mode is not explicitly described here. In the example shown, a diameter of 906.2 mm is given for the left side and a diameter of 902.2 mm for the right side.

Figure 9:
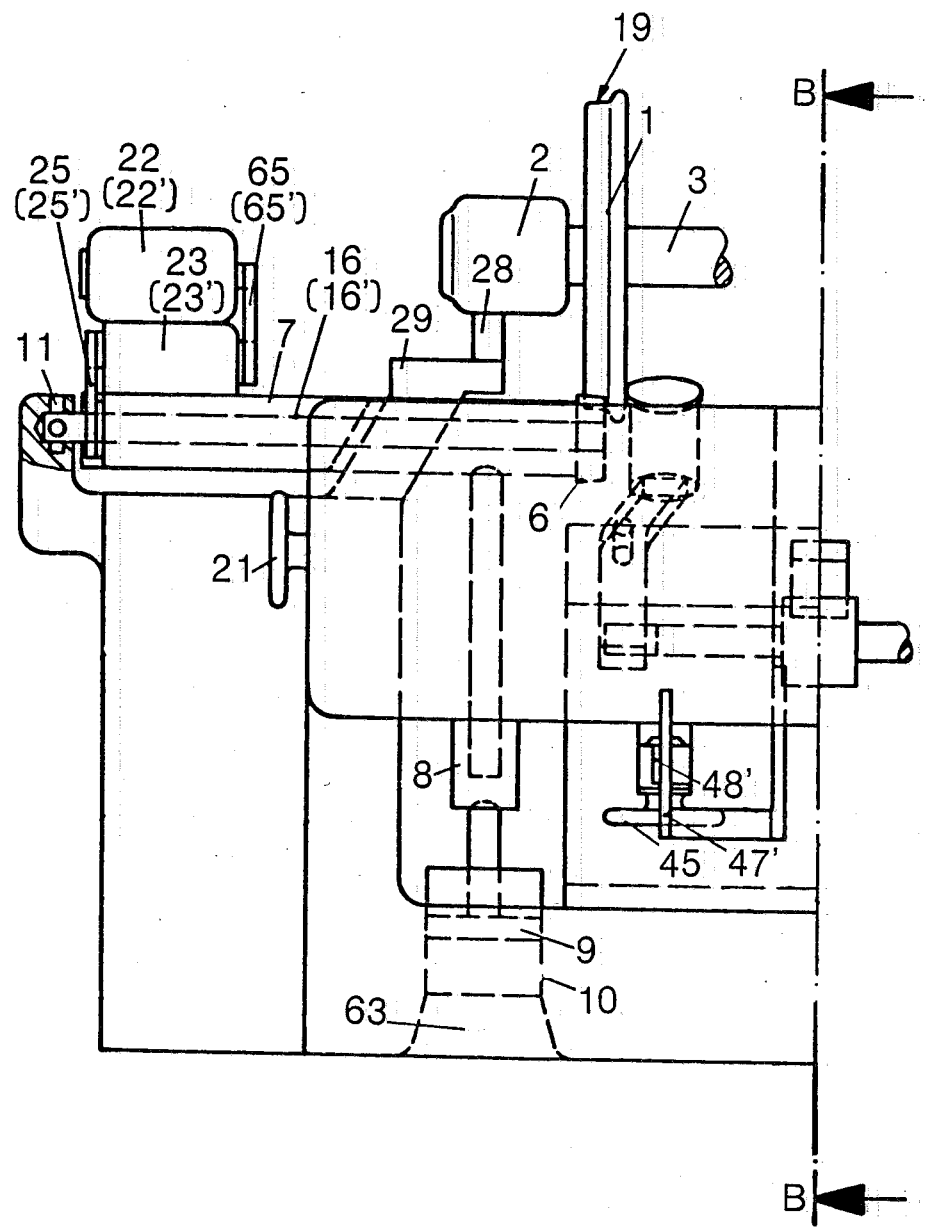
FIG. 9 is a side elevational view of the left half of the machine.
Figure 10:
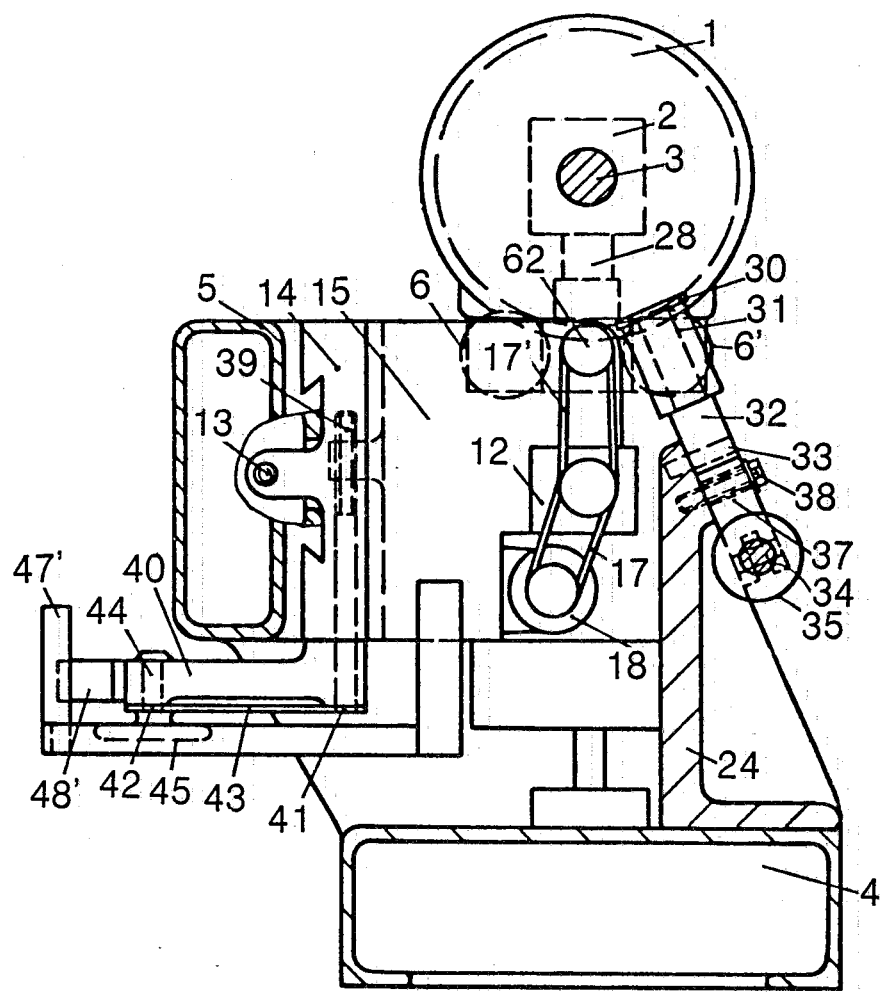
FIG. 10 is a sectional view taken on line B—B of FIG. 9.
Figure 11:
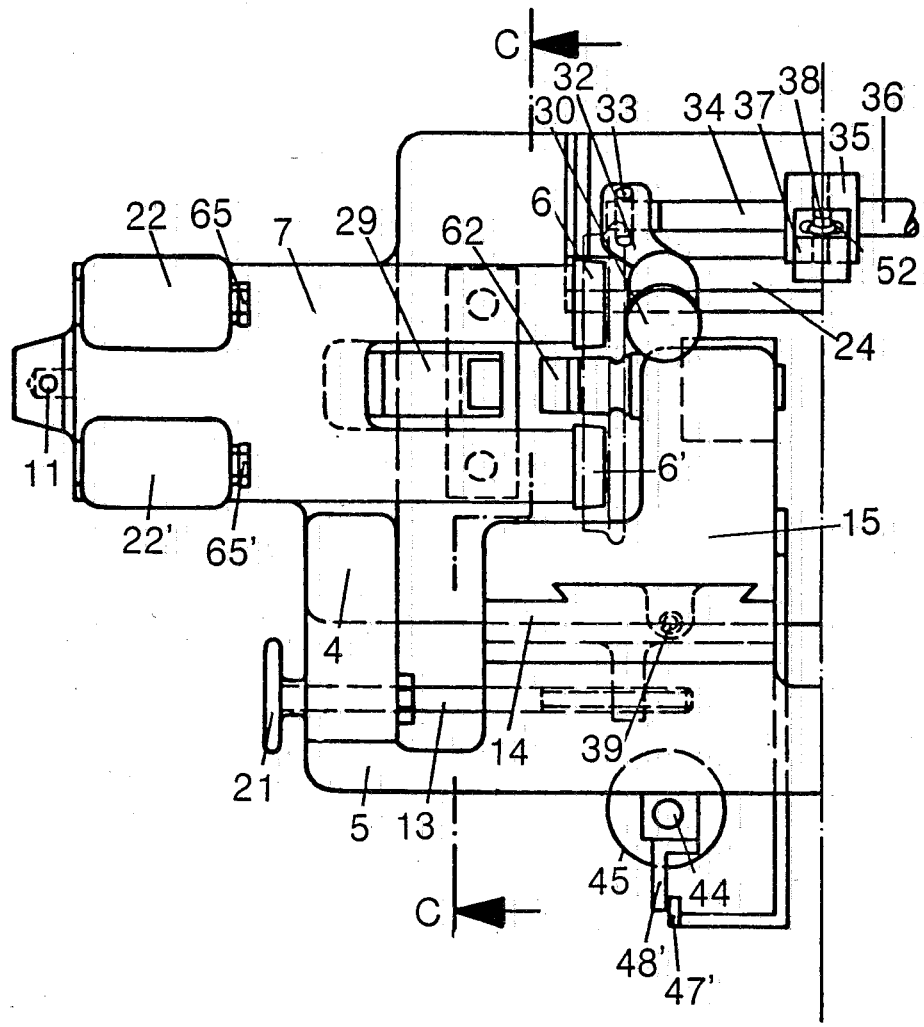
FIG. 11 is a top plan view of the left half of the machine.

In the machine (FIGS. 9 to 11) a wheelset is supported at its bearing housings 2 by means of a support 28. The support 28 is mounted on a fixed platform 29 fastened to the column 4. Each wheel 1 is supported at least in part at its tread 19 by support and drive rollers 6,6'. The rollers 6,6' are mounted to driveshafts 16,16' mounted rotatably and axially immovably in a roller carrier 7. Fastened to the rear end of each driveshaft 16,16' is a sprocket wheel which is in driving connection, via chains 25,25', with a sprocket wheel fastened to a transmission shaft of the transmission 23,23'. The transmission 23,23' is mounted to the roller carrier 7. Mounted to the transmission 23,23' is a motor 22,22'. Attached to the shaft of motor 22,22' is a sprocket wheel which is in driving connection, via a chain 65,65', with a transmission shaft of the transmission 23,23'.

Figure 12:
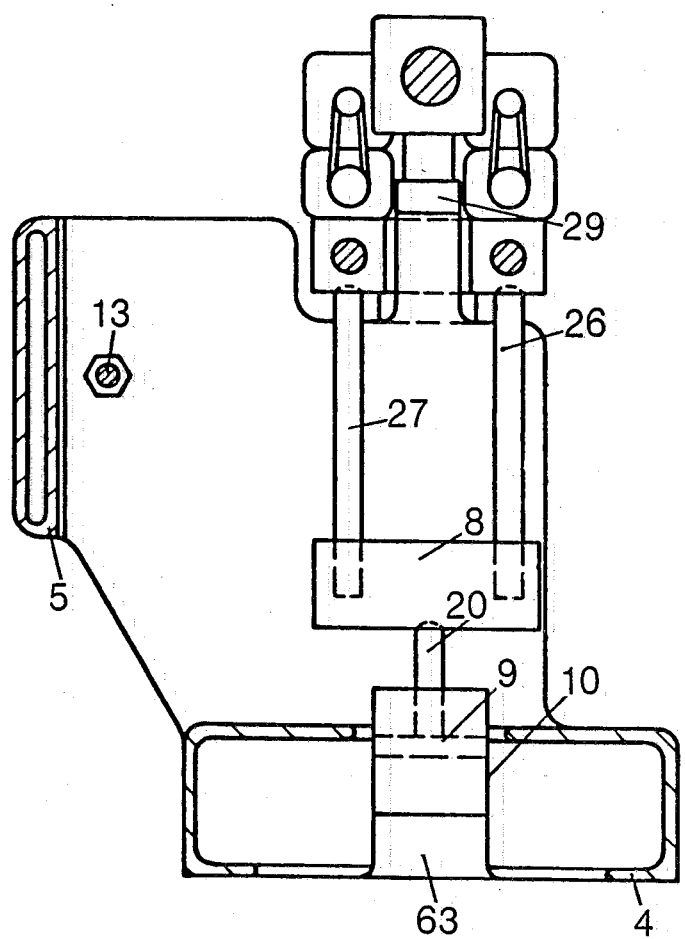
FIG. 12 is a sectional view taken on line C—C of FIG. 11.

The rear end of the roller carrier 7 is mounted in a horizontal pin of a universal joint 11. A vertical pin of the universal joint 11 is mounted to the column 4. The front end of the roller carrier 7 is supported by two rods 26,27 (FIG. 12) fastened to a yoke 8. In turn, the yoke 8 is supported by the piston rod 20 of a piston 9 sliding in a cylinder 10. The cylinder 10 is mounted on a foundation footing 63. The free ends of the rods 26,27 fastened in yoke 8 and the upper end of the piston rod 20 of piston 9, are of spherical design and are mounted in spherical concave seats of the roller carrier 7 and yoke 8, respectively.

The inner side surface of wheel 1 is in contact with a roller 30 mounted so that it can rotate about a pin 31.

The pin 31 is fastened in a lever 32 mounted so as to pivot about a pin 33. The pin 33 is fastened to the frame 24 so that its axis lies in the plane formed by the inner side surface of wheel 1. The free end of lever 32 is hinged to the piston rod 34 of a cylinder 35. The cylinder 35 is hinged, via a rod 36, to the free end of lever 32' (not shown) on the other side of the machine. Also fastened to the cylinder 35 is a plate 37 resting against a surface of frame 24. A slot 52 in the plate 37 gives the cylinder freedom of motion in the direction of the wheelset axis. The slot 52 is penetrated by a fastening screw 38 which is disposed in the frame 24 and can selectively be loosened or tightened. The longitudinal carriage 14 slides in its longitudinal ways. In the traverse ways of the longitudinal carriage 14 slides the transverse carriage 15, to which the profile milling cutter is rotatably mounted. In addition, a transmission 12 and a drive motor 18 are mounted on the transverse carriage 15. Profile milling cutter 62, transmission 12 and drive motor 18 are in driving conection with each other through chains 17 and 17'. The longitudinal carriage 14 is moved by a threaded spindle 13 mounted rotatably and axially immovably in the column 4. It is operated by a handwheel 21 attached to the threaded spindle 13. The cross carriage 15 is moved by a threaded spindle 39 mounted rotatably and axially immovably to a bearing block 40 fastened to the longitudinal carriage 14. Also mounted to the bearing block 40 so as to be rotatable and axially immovable is a handwheel shaft 44. A sprocket wheel 41 is fastened to the threaded spindle 39 and a sprocket wheel 42 to the handwheel shaft 44. Handwheel shaft 44 and threaded spindle 39 are in driving connection through the chain 43. Mounted to the handwheel shaft 44 is a handwheel 45. Pointer 48' and scale 47' interact.

The two scales 47,47' with their pointers 48,48' are also shown in FIG. 2. The radial position of the left and right profile milling cutters (only the left profile milling cutter 62 is shown) can be read here. The pointer 48' is fastened to the bearing block 40 which, in turn, is fastened to the longitudinal carriage 14 of the milling tool support consisting of the cross slide 15 and the longitudinal slide 14. Consequently, in radial direction, the position of the pointer 48' is always constant, thus forming a reference point for measuring a distance in radial direction. The pointer 48 is fastened in the same manner on the other side. But the left machine side only is shown for the sake of simplicity.

Figure 6:
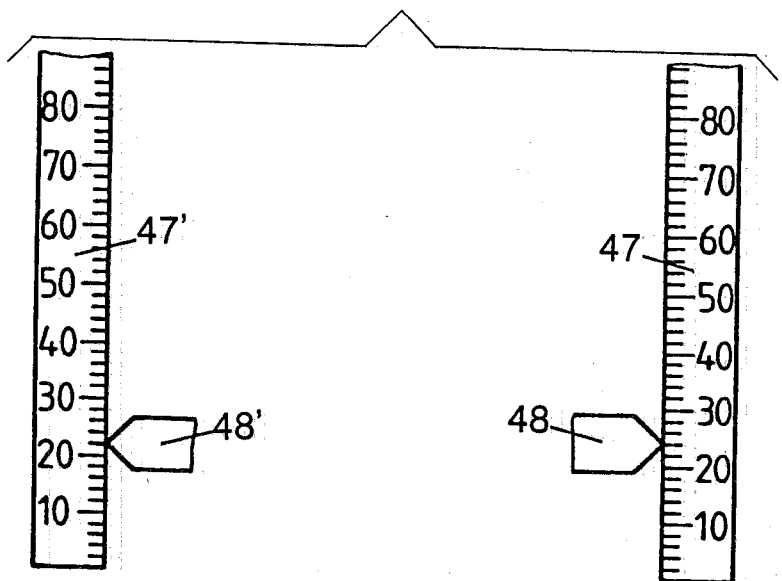
FIG. 6 is a view of superimposed scales in changed position.

The scale 47 indicated 26 mm while the scale 47' indicates 22 mm. In order to bring both profile milling cutters to the same distance from the wheelset axle 3, the position of the right profile milling cutter is corrected to the dimension 24 mm. This 2 mm correction is computed from half the difference of the diameters indicated by the counters 56 and 57. FIG. 6 shows the new position of the scales 47 and 47'. Therefore, it is known precisely that the setting of the right milling cutter support must be greater by 2 mm than that of the left milling cutter support, if the intention is to mill the wheels 1 of a wheelset to the same diameter. Now both wheels 1 are milled by infeeding until all black spots on both wheels have been machined or until the new profile 58 to be milled is barely tangent to the worn profile 59.

Figure 5:
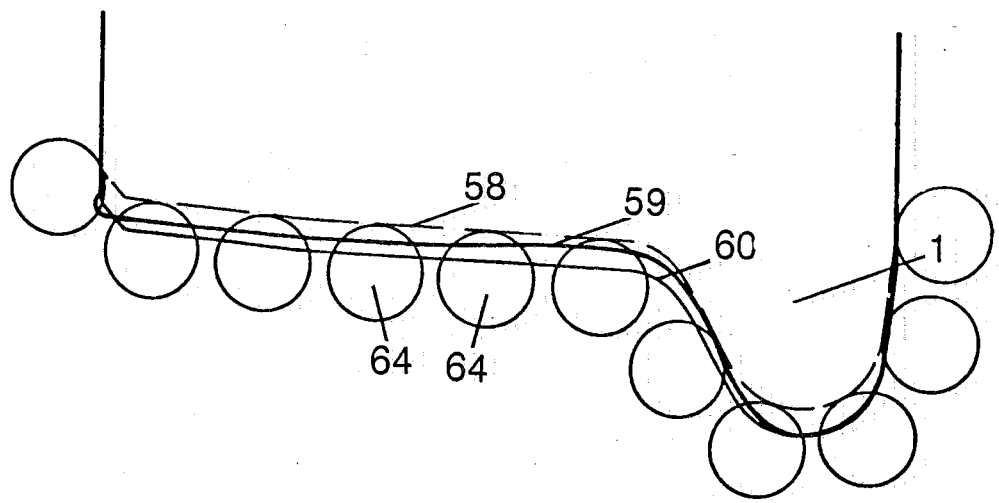
FIG. 5 is a view of the profile milling cutter in finish cut position.
Figure 7:
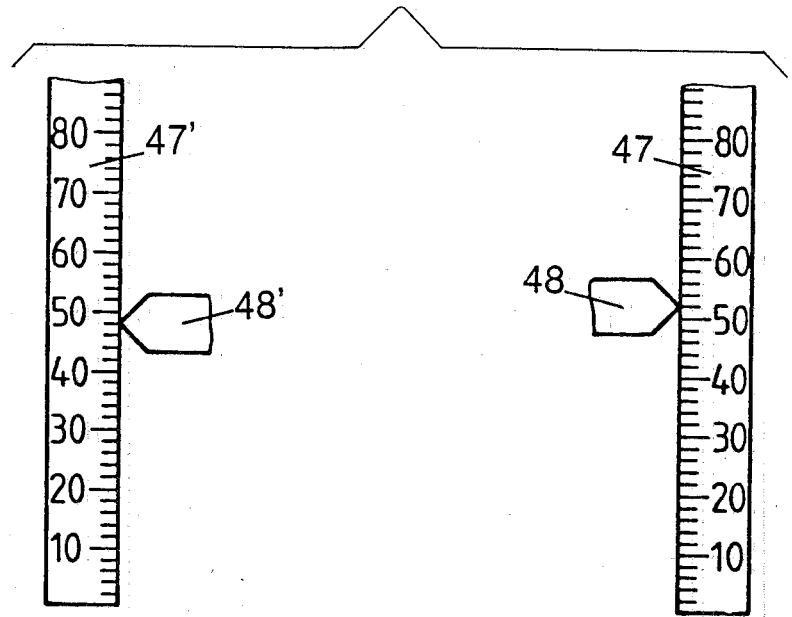
FIG. 7 is a view of superimposed scales in further changed position.
Figure 8:
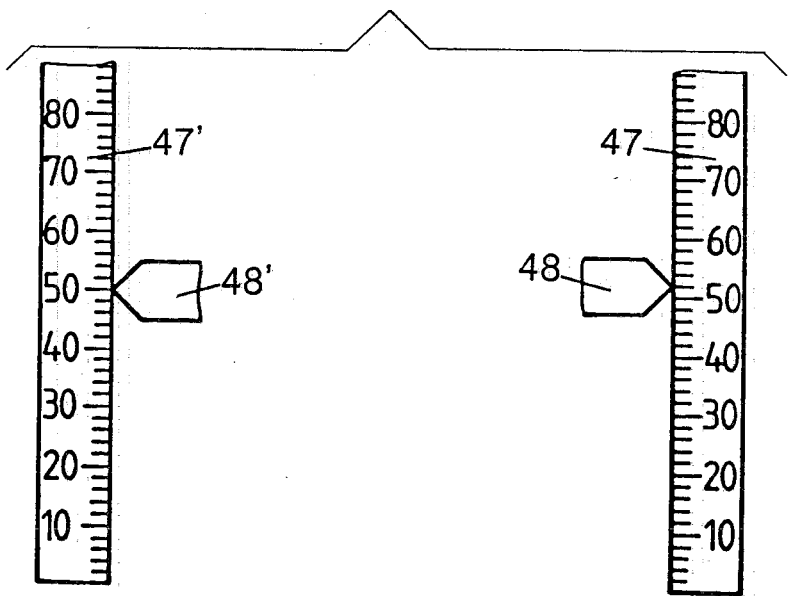
FIG. 8 is a view of superimposed scales in further changed position.

According to FIG. 7, the pointers 48,48' on the right tool support indicates a dimension of 52 mm, on the left tool support a dimension of 48 mm. Since it is known that the right side indication must be greater by 2 mm then the left one to obtain the same diameter and since the wheel 1 having the smaller diameter is obviously on the right, the left profile milling cutter must mill 2 mm deeper. The scales 47,47' and the pointers 48,48' will then assume the position according to FIG. 8. When the profile milling cutters have reached the position according to FIG. 8, the milling operation covering the entire circumference of the wheels 1 can start. During such operation, the various cutting plates 64 of the profile milling cutter 62 assume a radial positon as shown in FIG. 5.

As will be apparent, the instant disclosure is somewhat diagrammatic in its manner of illustration. However, the operation of the device will be evident to those skilled in the art.

The present device provides an apparatus and method for rapidly and accurately reprofiling worn wheels of the wheelset of a railroad car. Numerous variations will occur to those skilled in the art and familiarized with the instant disclosure. Accordingly, the same should be broadly construed with the scope of the appended claims.

Having thus described the invention and illustrated its use, what is claimed as new and is desired to be secured by Letters Patent of the United States is:

1. The method of reprofiling the wheels of a railroad wheelset by a circumferential milling operation utilizing at least one milling cutter per wheel, comprising the steps of partially supporting the wheelsets at the bearing housing thereof, causing each wheel to be engaged by drive and support rollers, providing a turning means adjacent each said wheel, causing a turning operation to be performed on said wheels at laterally limited zones within the area to be reprofiled, said turning operations being effected to a minumum depth at least sufficient to produce a circumferential clean surface throughout said zone and a maximum depth not greater than the cutting depth needed to produce the revised profile, establishing a predetermined heightwise relation between the turning means for each of said wheels, providing a milling apparatus including milling cutter drive means adapted to mill each of said wheels, the spacing of the cutting components of each said milling apparatus from the axis of said wheelset being coordinated with the spacing of said turning means for each respective wheel whereby the establishment of a predetermined spacing of each said turning means from said wheel axis also establishes a predetermined relation of a said milling apparatus and said axis, and thereafter milling the entirety of said surfaces to be profiled utilizing the position of said turning means following formation of said turned zones as a reference to establish the amount of radial infeed for said milling operation.

2. Method according to claim 1, characterized in that the turning operation is performed as a grooving operation.

3. Method according to claim 1, characterized in that the turning operation is performed in the area of the profile zone comprising the rim flange and produces a cylindrical surface.

4. Method in accordance with claim 1 wherein said turning operation is effected by a cutting component of said milling apparatus.

5. In an apparatus for the reprofiling of the wheels of a railroad wheelset by a circumferential milling operation comprising a pair of support means for said wheels, said support means each including portions engaging a bearing housing and a pair of rollers engaging at least the tread of a wheel, at least one of said rollers being driven to effect rotation of its associated wheel, means for moving said support means both horizontally and vertically, said apparatus including means for resisting movement of said wheels in the direction of the horizontal component of a cutting force applied to said wheels, the improvement which comprises first and second turning means each moveably mounted relative to a respective one of said wheels for forming a circumferential cut about a peripherial zone forming a portion of the area of the wheel to be reprofiled to define a reference surface, milling means including cutter drive means moveable relative to said wheels for reprofiling said wheels, said milling means being in a predetermined positon relative to said turning means, and means for sensing said reference surface and correlating the movement of said milling means with the position of said turning means to effect a desired depth of cut in accordance with said reference surface formed by said turning means.

6. Apparatus in accordance with claim 5 and including means for moving said turning means in the direction of the axis of rotation of said wheel.

7. Apparatus in accordance with claim 5 and including means for moving said turning means in a radial direction relative to the axis of rotation of said wheel.

8. Apparatus in accordance with claim 5 wherein said turning means is mounted on said milling means, the combination including locking means for locking said turning and milling means in a selected angularly related positon adapted to effect said turning operation, and means for moving said turning means and milling means in a selected path relative to said wheel.

9. Apparatus in accordance with claim 8 wherein said milling means includes a plurality of cutting plates and said turning means comprises one of said plates.

* * * * *